United States Patent
Jiang et al.

(10) Patent No.: US 8,253,700 B2
(45) Date of Patent: *Aug. 28, 2012

(54) TOUCH PANEL AND DISPLAY DEVICE USING THE SAME

(75) Inventors: Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 608 days.

This patent is subject to a terminal disclaimer.

(21) Appl. No.: 12/286,181

(22) Filed: Sep. 29, 2008

(65) Prior Publication Data

US 2009/0153521 A1   Jun. 18, 2009

(30) Foreign Application Priority Data

Dec. 14, 2007   (CN) .......................... 2007 1 0125113

(51) Int. Cl.
 *G06F 3/041*   (2006.01)
(52) U.S. Cl. ......... 345/173; 345/174; 313/336; 257/222
(58) Field of Classification Search .................. 345/173; 524/496; 257/222; 349/12; 313/336; 428/339
See application file for complete search history.

(56) References Cited

U.S. PATENT DOCUMENTS

| | | | |
|---|---|---|---|
| 4,659,873 A | 4/1987 | Gibson et al. |
| 4,922,061 A | 5/1990 | Meadows et al. |
| 4,933,660 A | 6/1990 | Wynne, Jr. |
| 5,181,030 A | 1/1993 | Itaya et al. |
| 5,853,877 A | 12/1998 | Shibuta |
| 5,861,583 A | 1/1999 | Schediwy et al. |
| 6,373,472 B1 | 4/2002 | Palalau et al. |
| 6,423,583 B1 | 7/2002 | Avouris et al. |
| 6,628,269 B2 | 9/2003 | Shimizu |
| 6,629,833 B1 | 10/2003 | Ohya et al. |
| 6,914,640 B2 | 7/2005 | Yu |
| 6,947,203 B2 | 9/2005 | Kanbe |
| 7,054,064 B2 | 5/2006 | Jiang et al. |
| 7,060,241 B2 | 6/2006 | Glatkowski |
| 7,071,927 B2 | 7/2006 | Blanchard |

(Continued)

FOREIGN PATENT DOCUMENTS

CN    2539375    3/2003

(Continued)

OTHER PUBLICATIONS

Kai-Li Jiang, Qun-Qing Li, Shou-Shan Fan, "Continuous carbon nanotube yarns and their applications", Physics, China, pp. 506-510, Aug. 31, 2003, 32(8)(lines from the 4th line to 35th line in the right column of p. 507 may be relevant).

(Continued)

*Primary Examiner* — Nimeshkumar Patel
*Assistant Examiner* — Mary Ellen Bowman
(74) *Attorney, Agent, or Firm* — Altis Law Group, Inc.

(57) ABSTRACT

An exemplary touch panel includes a flexible substrate, a transparent conductive layer, and four electrodes. The flexible substrate includes a surface. The transparent conductive layer is disposed on the surface of the substrate. The transparent conductive layer includes a carbon nanotube layer. The carbon nanotube layer includes carbon nanotubes. The electrodes are separately disposed, and electrically connected with the transparent conductive layer. A display device using the above-described touch panel is also provided.

19 Claims, 5 Drawing Sheets

U.S. PATENT DOCUMENTS

| | | | |
|---|---|---|---|
| 7,084,933 B2 * | 8/2006 | Oh et al. ........................ 349/12 |
| 7,196,463 B2 | 3/2007 | Okai et al. |
| 7,215,329 B2 | 5/2007 | Yoshikawa et al. |
| 7,242,136 B2 | 7/2007 | Kim et al. |
| 7,336,261 B2 | 2/2008 | Yu |
| 7,348,966 B2 | 3/2008 | Hong et al. |
| 7,355,592 B2 | 4/2008 | Hong et al. |
| 7,532,182 B2 | 5/2009 | Tseng et al. |
| 7,593,004 B2 | 9/2009 | Spath et al. |
| 7,630,040 B2 | 12/2009 | Liu et al. |
| 7,662,732 B2 | 2/2010 | Choi et al. |
| 7,663,607 B2 | 2/2010 | Hotelling et al. |
| 7,704,480 B2 | 4/2010 | Jiang et al. |
| 7,710,649 B2 | 5/2010 | Feng et al. |
| 7,796,123 B1 | 9/2010 | Irvin, Jr. et al. |
| 7,825,911 B2 | 11/2010 | Sano et al. |
| 7,854,992 B2 | 12/2010 | Fu et al. |
| 7,947,977 B2 | 5/2011 | Jiang et al. |
| 2002/0089492 A1 | 7/2002 | Ahn et al. |
| 2003/0122800 A1 * | 7/2003 | Yu .................. 345/173 |
| 2003/0147041 A1 | 8/2003 | Oh et al. |
| 2003/0189235 A1 | 10/2003 | Watanabe et al. |
| 2004/0047038 A1 | 3/2004 | Jiang et al. |
| 2004/0053780 A1 | 3/2004 | Jiang et al. |
| 2004/0099438 A1 | 5/2004 | Arthur et al. |
| 2004/0105040 A1 | 6/2004 | Oh et al. |
| 2004/0136896 A1 | 7/2004 | Liu et al. |
| 2004/0191157 A1 | 9/2004 | Harutyunyan et al. |
| 2004/0251504 A1 | 12/2004 | Noda |
| 2005/0110720 A1 | 5/2005 | Akimoto et al. |
| 2005/0151195 A1 | 7/2005 | Kawase et al. |
| 2005/0209392 A1 * | 9/2005 | Luo et al. ..................... 524/496 |
| 2006/0010996 A1 | 1/2006 | Jordan et al. |
| 2006/0022221 A1 * | 2/2006 | Furukawa et al. ............. 257/222 |
| 2006/0044284 A1 | 3/2006 | Tanabe |
| 2006/0077147 A1 | 4/2006 | Palmateer et al. |
| 2006/0097991 A1 | 5/2006 | Hotelling et al. |
| 2006/0171032 A1 | 8/2006 | Nishioka |
| 2006/0187213 A1 | 8/2006 | Su |
| 2006/0187369 A1 | 8/2006 | Chang |
| 2006/0188721 A1 | 8/2006 | Irvin, Jr. et al. |
| 2006/0213251 A1 | 9/2006 | Rinzler et al. |
| 2006/0240605 A1 | 10/2006 | Moon et al. |
| 2006/0262055 A1 | 11/2006 | Takahara |
| 2006/0263588 A1 | 11/2006 | Handa et al. |
| 2006/0274047 A1 | 12/2006 | Spath et al. |
| 2006/0274048 A1 * | 12/2006 | Spath et al. ................... 345/173 |
| 2006/0274049 A1 | 12/2006 | Spath et al. |
| 2006/0275956 A1 * | 12/2006 | Konesky ..................... 438/128 |
| 2006/0278444 A1 | 12/2006 | Binstead |
| 2007/0065651 A1 | 3/2007 | Glatkowski et al. |
| 2007/0075619 A1 | 4/2007 | Jiang et al. |
| 2007/0081681 A1 | 4/2007 | Yu et al. |
| 2007/0099333 A1 | 5/2007 | Moriya |
| 2007/0165004 A1 | 7/2007 | Seelhammer et al. |
| 2007/0182720 A1 | 8/2007 | Fujii et al. |
| 2007/0215841 A1 | 9/2007 | Ford et al. |
| 2007/0257894 A1 | 11/2007 | Philipp |
| 2007/0262687 A1 | 11/2007 | Li |
| 2007/0279556 A1 | 12/2007 | Wang et al. |
| 2007/0296897 A1 | 12/2007 | Liu et al. |
| 2007/0298253 A1 * | 12/2007 | Hata et al. ..................... 428/339 |
| 2008/0007535 A1 | 1/2008 | Li |
| 2008/0029292 A1 | 2/2008 | Takayama et al. |
| 2008/0048996 A1 | 2/2008 | Hu et al. |
| 2008/0088219 A1 | 4/2008 | Yoon et al. |
| 2008/0095694 A1 | 4/2008 | Nakayama et al. |
| 2008/0129666 A1 | 6/2008 | Shimotono et al. |
| 2008/0138589 A1 | 6/2008 | Wakabayashi et al. |
| 2008/0192014 A1 * | 8/2008 | Kent et al. ..................... 345/173 |
| 2008/0238882 A1 | 10/2008 | Sivarajan et al. |
| 2008/0266273 A1 | 10/2008 | Slobodin et al. |
| 2009/0032777 A1 | 2/2009 | Kitano et al. |
| 2009/0056854 A1 | 3/2009 | Oh et al. |
| 2009/0059151 A1 | 3/2009 | Kim et al. |
| 2009/0101488 A1 | 4/2009 | Jiang et al. |
| 2009/0153511 A1 | 6/2009 | Jiang et al. |
| 2009/0153513 A1 | 6/2009 | Liu et al. |
| 2009/0153516 A1 | 6/2009 | Liu et al. |
| 2009/0167709 A1 | 7/2009 | Jiang et al. |
| 2009/0208708 A1 | 8/2009 | Wei et al. |
| 2009/0283211 A1 | 11/2009 | Matsuhira |
| 2009/0293631 A1 | 12/2009 | Radivojevic |
| 2010/0001972 A1 | 1/2010 | Jiang et al. |
| 2010/0001975 A1 | 1/2010 | Jiang et al. |
| 2010/0001976 A1 | 1/2010 | Jiang et al. |
| 2010/0007619 A1 | 1/2010 | Jiang et al. |
| 2010/0007624 A1 | 1/2010 | Jiang et al. |
| 2010/0007625 A1 | 1/2010 | Jiang et al. |
| 2010/0065788 A1 | 3/2010 | Momose et al. |
| 2010/0078067 A1 | 4/2010 | Jia et al. |
| 2010/0093247 A1 | 4/2010 | Jiang et al. |
| 2010/0171099 A1 | 7/2010 | Tombler, Jr. et al. |
| 2010/0271330 A1 | 10/2010 | Philipp |
| 2011/0032196 A1 | 2/2011 | Feng et al. |

FOREIGN PATENT DOCUMENTS

| | | |
|---|---|---|
| CN | 1447279 | 10/2003 |
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |
| CN | 1543399 A | 11/2004 |
| CN | 1671481 | 9/2005 |
| CN | 1675580 | 9/2005 |
| CN | 1690915 A | 11/2005 |
| CN | 1738018 | 2/2006 |
| CN | 1744021 A | 3/2006 |
| CN | 1745302 | 3/2006 |
| CN | 1803594 | 7/2006 |
| CN | 1823320 | 8/2006 |
| CN | 1292292 C | 12/2006 |
| CN | 2844974 Y | 12/2006 |
| CN | 1903793 | 1/2007 |
| CN | 1942853 | 4/2007 |
| CN | 1947203 | 4/2007 |
| CN | 1948144 | 4/2007 |
| CN | 1315362 | 5/2007 |
| CN | 1982209 | 6/2007 |
| CN | 1996620 | 7/2007 |
| CN | 1998067 | 7/2007 |
| CN | 101017417 | 8/2007 |
| CN | 101059738 | 10/2007 |
| CN | 101165883 | 4/2008 |
| DE | 202007006407 | 9/2007 |
| EP | 1739692 | 1/2007 |
| JP | S61-231626 | 10/1986 |
| JP | S62-63332 | 3/1987 |
| JP | 62-139028 | 6/1987 |
| JP | S62-182916 | 8/1987 |
| JP | S62-190524 | 8/1987 |
| JP | H2-8926 | 1/1990 |
| JP | 1991-54624 | 3/1991 |
| JP | H3-54624 | 3/1991 |
| JP | 5-53715 | 3/1993 |
| JP | H06-28090 | 2/1994 |
| JP | H6-67788 | 3/1994 |
| JP | 8-287775 | 11/1996 |
| JP | H10-63404 | 3/1998 |
| JP | 2001-34419 | 2/2001 |
| JP | 2001-267982 | 9/2001 |
| JP | 2002-278701 | 9/2002 |
| JP | 2003-99192 | 4/2003 |
| JP | 2003-99193 | 4/2003 |
| JP | 2003-288164 | 10/2003 |
| JP | 2003303978 | 10/2003 |
| JP | 2004-26532 | 1/2004 |
| JP | 2004-102217 | 4/2004 |
| JP | 2004-189573 | 7/2004 |
| JP | 2004-266272 | 9/2004 |
| JP | 2005-67976 | 3/2005 |

| | | |
|---|---|---|
| JP | 2005-85485 | 3/2005 |
| JP | 2005-176428 | 6/2005 |
| JP | 2005-182339 | 7/2005 |
| JP | 2005-222182 | 8/2005 |
| JP | 2005-286158 | 10/2005 |
| JP | 2006-171336 | 6/2006 |
| JP | 2006-228818 | 8/2006 |
| JP | 2006-243455 | 9/2006 |
| JP | 2006-521998 | 9/2006 |
| JP | 2004-253796 | 10/2006 |
| JP | 2006-269311 | 10/2006 |
| JP | 2006-285068 | 10/2006 |
| JP | 2007-11997 | 1/2007 |
| JP | 2007-31238 | 2/2007 |
| JP | 2007-73706 | 3/2007 |
| JP | 2007-112133 | 5/2007 |
| JP | 2007-123870 | 5/2007 |
| JP | 2007-161563 | 6/2007 |
| JP | 2007-161576 | 6/2007 |
| JP | 2007-182357 | 7/2007 |
| JP | 2007-182546 | 7/2007 |
| JP | 2007-229989 | 9/2007 |
| JP | 2007-299409 | 11/2007 |
| JP | 2007-310869 | 11/2007 |
| JP | 2008-102968 | 5/2008 |
| JP | 2008-139711 | 6/2008 |
| JP | 2008-536710 | 9/2008 |
| JP | 2008-542953 | 11/2008 |
| JP | 2009-104577 | 5/2009 |
| KR | 0525731 | 11/2005 |
| KR | 20060129977 | 12/2006 |
| KR | 20070012414 | 1/2007 |
| KR | 20070081902 | 8/2007 |
| KR | 2007-0108077 | 11/2007 |
| TW | 131955 | 4/1990 |
| TW | 341684 | 10/1998 |
| TW | 498266 | 8/2002 |
| TW | 508652 | 11/2002 |
| TW | 521227 | 2/2003 |
| TW | 200403498 | 3/2004 |
| TW | 242732 | 9/2004 |
| TW | 200518195 | 6/2005 |
| TW | I233570 | 6/2005 |
| TW | I234676 | 6/2005 |
| TW | 200522366 | 7/2005 |
| TW | 284963 | 1/2006 |
| TW | I249134 | 2/2006 |
| TW | I249708 | 2/2006 |
| TW | I251710 | 3/2006 |
| TW | I253846 | 4/2006 |
| TW | 200622432 | 7/2006 |
| TW | I258708 | 7/2006 |
| TW | I261716 | 9/2006 |
| TW | I267014 | 11/2006 |
| TW | M306694 | 2/2007 |
| TW | 200710493 | 3/2007 |
| TW | 200713337 | 4/2007 |
| TW | 200717083 | 5/2007 |
| TW | 200719198 | 5/2007 |
| TW | D117141 | 5/2007 |
| TW | 200722559 | 6/2007 |
| TW | 200727163 | 7/2007 |
| TW | 284927 | 8/2007 |
| TW | 200729241 | 8/2007 |
| TW | 200736979 | 10/2007 |
| TW | 200737414 | 10/2007 |
| TW | 200738558 | 10/2007 |
| TW | 200928914 | 7/2009 |
| TW | 200929638 | 7/2009 |
| TW | 200929643 | 7/2009 |
| TW | 201005612 | 7/2009 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005102924 | 11/2005 |
| WO | WO2005104141 | 11/2005 |
| WO | WO2006003245 | 1/2006 |
| WO | WO2006014241 | 2/2006 |
| WO | WO2006030981 | 3/2006 |
| WO | WO2006031981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |
| WO | WO2008013517 | 1/2008 |

OTHER PUBLICATIONS

Yu Xiang, Technique of Touch Panel & the Production of Resistance-type Touch Panel Insulation Dot, Journal of Longyan Teachers College, p. 25-26, vol. 22, No. 6, 2004.
Ri Kurosawa, "Technology Trends of Capacitive Touch Panel", Technology and Development of Touch Panel, AMC, First Impression, pp. 54-64, Dec. 27, 2004(the 6th paragraph on p. 55 may be relevant).
George Gruner, "Carbon Nanonets Spark New Electronics", Scientific American, pp. 76-83, May 2007.
Yagasaki Takuya, Nakanishi Rou, "Resistance Film Type Touch Panel", Technologies and Developments of Touch Panels, AMC, First Impression, pp. 80-93, Dec. 27, 2004(the 2nd Paragraph on p. 81 and the 2nd Paragraph on p. 91 may be relevant).
Mei Zhang etal., "Strong Transparent, Multifunctional, Carbon Nanotube Sheets", Science, America, AAAS, vol. 309, pp. 1215-1219, Aug. 19, 2005.
Yoshikazu Nakayama, "Technology Development of CNT Long Yarns and CNT Sheets", Nano Carbon Handbook, Japan TSN Inc, pp. 261-266, Jul. 17, 2007(the First 6 Sentences of 2nd, 3rd,4th Paragraphs and the first 3 sentences of 5th paragraph on p. 262,the 4th paragraph on p. 264 and the 5th sentence of 3rd paragraph on p. 265 may be relevant).
Susuki et al."Investigation of physical and electric properties of silver pastes as binder for thermoelectric materials". Review of Scientific Instruments,76,(2005);pp. 023907-1 to 023907-5.
ASM Handbook."vol. 2 Properties and Selection: Nonferrous Alloys and Special-Purpose Materials".Apr. 2007; pp. 840-853.
Fan et al. "Self-Oriented Regular Arrays of Carbon Nanotubes and Their Field Emission Properties". Science, vol. 283, (1999); pp. 512-514.
Wu et al."Transparent, Conductive Carbon Nanotube Films". Science,vol. 305,(2004);pp. 1273-1276.
R Colin Johnson, "Carbon nanotubes aim for cheap, durable touch screens",Aug. 2008 http://psroc.phys.ntu.edu.tw/bimonth/v27/615.pdf.
Xianglin Liu, "Strong, transparent, multifunctional carbon nanotube sheets", pp. 720-721, Oct. 2005 http://www.eettaiwan.com/articleLogin.do?artId=8800474428&fromWhere=/ART_8800474428_480502_NT_95e7014f.HTM&catId=480502&newsType=NT&pageNo=null&encode=95e7014f.

* cited by examiner

TOUCH PANEL AND DISPLAY DEVICE USING THE SAME

RELATED APPLICATIONS

This application is related to commonly-assigned application Ser. No. 12/286,266, entitled, "TOUCH PANEL", filed on Sep. 29, 2008; Ser. No. 12/286,141, entitled, "TOUCH PANEL", filed on Sep. 29, 2008; Ser. No. 12/286,154, entitled, "TOUCH PANEL AND DISPLAY DEVICE USING THE SAME", filed on Sep. 29, 2008; Ser. No. 12/286,189, entitled, "TOUCH PANEL AND DISPLAY DEVICE USING THE SAME", filed on Sep. 29, 2008; Ser. No. 12/286,176, entitled, "TOUCH PANEL AND DISPLAY DEVICE USING THE SAME", filed on Sep. 29, 2008; Ser. No. 12/286,143, entitled, "ELECTRONIC ELEMENT HAVING CARBON NANOTUBES", filed on Sep. 29, 2008; Ser. No. 12/286,166, entitled, "TOUCH PANEL AND DISPLAY DEVICE USING THE SAME", filed on Sep. 29, 2008; Ser. No. 12/286,178, entitled, "TOUCH PANEL AND DISPLAY DEVICE USING THE SAME", filed on Sep. 29, 2008; Ser. No. 12/286,148, entitled, "TOUCH PANEL AND DISPLAY DEVICE USING THE SAME", filed on Sep. 29, 2008; Ser. No. 12/286,140, entitled, "TOUCHABLE CONTROL DEVICE", filed on Sep. 29, 2008; Ser. No. 12/286,146, entitled, "TOUCH PANEL AND DISPLAY DEVICE USING THE SAME", filed on Sep. 29, 2008; Ser. No. 12/286,216, entitled, "TOUCH PANEL AND DISPLAY DEVICE USING THE SAME", filed on Sep. 29, 2008; Ser. No. 12/286,152, entitled, "TOUCH PANEL AND DISPLAY DEVICE USING THE SAME", filed on Sep. 29, 2008; Ser. No. 12/286,145, entitled, "TOUCH PANEL AND DISPLAY DEVICE USING THE SAME", filed on Sep. 29, 2008; Ser. No. 12/286,155, entitled, "TOUCH PANEL, METHOD FOR MAKING THE SAME, AND DISPLAY DEVICE ADOPTING THE SAME", filed on Sep. 29, 2008; Ser. No. 12/286,179, entitled, "TOUCH PANEL AND DISPLAY DEVICE USING THE SAME", filed on Sep. 29, 2008; Ser. No. 12/286,228, entitled, "TOUCH PANEL, METHOD FOR MAKING THE SAME, AND DISPLAY DEVICE ADOPTING THE SAME", filed on Sep. 29, 2008; Ser. No. 12/286,153, entitled, "TOUCH PANEL AND DISPLAY DEVICE USING THE SAME", filed; Ser. No. 12/286,184, entitled, "TOUCH PANEL AND DISPLAY DEVICE USING THE SAME", filed on Sep. 29, 2008; Ser. No. 12/286,175, entitled, "METHOD FOR MAKING TOUCH PANEL", filed on Sep. 29, 2008; Ser. No. 12/286,195, entitled, "METHOD FOR MAKING TOUCH PANEL", filed on Sep. 29, 2008; Ser. No. 12/286,160, entitled, "TOUCH PANEL AND DISPLAY DEVICE USING THE SAME", filed on Sep. 29, 2008; Ser. No. 12/286,220, entitled, "TOUCH PANEL AND DISPLAY DEVICE USING THE SAME", filed on Sep. 29, 2008; Ser. No. 12/286,227, entitled, "TOUCH PANEL AND DISPLAY DEVICE USING THE SAME", filed on Sep. 29, 2008; Ser. No. 12/286,144, entitled, "TOUCH PANEL AND DISPLAY DEVICE USING THE SAME", filed on Sep. 29, 2008; Ser. No. 12/286,218, entitled, "TOUCH PANEL AND DISPLAY DEVICE USING THE SAME", filed on Sep. 29, 2008; Ser. No. 12/286,142, entitled, "TOUCH PANEL AND DISPLAY DEVICE USING THE SAME", filed on Sep. 29, 2008; Ser. No. 12/286,241, entitled, "TOUCH PANEL AND DISPLAY DEVICE USING THE SAME", filed on Sep. 29, 2008; Ser. No. 12/286,151, entitled, "TOUCH PANEL, METHOD FOR MAKING THE SAME, AND DISPLAY DEVICE ADOPTING THE SAME", filed on Sep. 29, 2008; and Ser. No. 12/286,219, entitled, "TOUCH PANEL, METHOD FOR MAKING THE SAME, AND DISPLAY DEVICE ADOPTING THE SAME", filed on Sep. 29, 2008; The disclosures of the above-identified applications are incorporated herein by reference.

BACKGROUND

1. Field of the Invention

The present invention relates to touch panels and, particularly, to a carbon nanotube based touch panel and a display device using the same.

2. Discussion of Related Art

Following the advancement in recent years of various electronic apparatuses, such as mobile phones, car navigation systems and the like, toward high performance and diversification, there has been continuous growth in the number of electronic apparatuses equipped with optically transparent touch panels at the front of their respective display devices (e.g., liquid crystal panels). A user of any such electronic apparatus operates it by pressing or touching the touch panel with a finger, a pen, a stylus, or another like tool while visually observing the display device through the touch panel. Therefore, a demand exists for touch panels that provide superior visibility and reliable operation.

Up to the present time, different types of touch panels, including resistance, capacitance, infrared, and surface sound-wave types, have been developed. The capacitance-type touch panel has advantages such as high accuracy and excellent transparency, and thus has been widely used.

A conventional capacitance-type touch panel includes a glass substrate, a transparent conductive layer, and four electrodes. The material of the transparent conductive layer is selected from a group consisting of indium tin oxide (ITO) and antimony tin oxide (ATO). The electrodes are made of metal and are separately formed on a surface of the transparent conductive layer. Further, a protective layer is formed on the surface of the transparent conductive layer that faces away from the substrate. The material of the protective layer has insulative and transparent characteristics.

In operation, an upper surface of the touch panel is pressed/touched with a touch tool, such as a user's finger or an electrical pen. Visual observation of a screen on the liquid crystal display device provided on a back side of the touch panel is allowed. In use, due to an electrical field of the user, a coupling capacitance forms between the user and the transparent conductive layer. For high frequency electrical current, the coupled capacitance is a conductor, and thus the touch tool takes away a little current from the touch point. Currents flowing through the four electrodes cooperatively replace the current lost at the touch point. The quantity of currents supplied by the four electrodes is directly proportional to the distances from the touch point to the electrodes. A touch panel controller is used to calculate the proportion of the four supplied currents, thereby detecting coordinates of the touch point on the touch panel.

With the advent of roll-to-roll technology, e-papers (i.e., microencapsulated electrophoretic displays), flexible liquid crystal displays, and flexible organic light emitting displays (OLEDs) have been developed. Accordingly, a touch panel used with such flexible displays should be flexible too. However, the glass substrate of the above-described conventional touch panel is rigid. As such, the conventional touch panel is unsuitable for use with a flexible display. In addition, the ITO layer of the conventional touch panel has generally poor mechanical durability, low chemical endurance, and uneven resistance over an entire area of the touch panel. Furthermore, the ITO layer has relatively low transparency in humid environments. All the above-mentioned problems of the ITO layer tend to yield a touch panel with relatively low sensitivity, accuracy, and brightness. Moreover, the ITO layer is generally formed by means of ion-beam sputtering, and this method is relatively complicated.

What is needed, therefore, is to provide a flexible touch panel and a display device using the same having good durability, and high sensitivity, accuracy, and brightness.

SUMMARY

In one embodiment, a touch panel includes a flexible substrate, a transparent conductive layer, and at least two electrodes. The flexible substrate includes a surface. The transparent conductive layer is disposed on the surface of the substrate. The transparent conductive layer includes a carbon nanotube layer. The carbon nanotube layer includes a plurality of carbon nanotubes. The at least two electrodes is separately disposed, and electrically connected with the transparent conductive layer. A display device using the above-described touch panel is also included.

Other advantages and novel features of the present touch panel and display device using the same will become more apparent from the following detailed description of exemplary embodiments, when taken in conjunction with the accompanying drawings.

BRIEF DESCRIPTION OF THE DRAWINGS

Many aspects of the present touch panel and display device using the same can be better understood with reference to the following drawings. The components in the drawings are not necessarily to scale, the emphasis instead being placed upon clearly illustrating the principles of the present touch panel and display device using the same. In the drawings, all the stated views are schematic.

Figure 1:
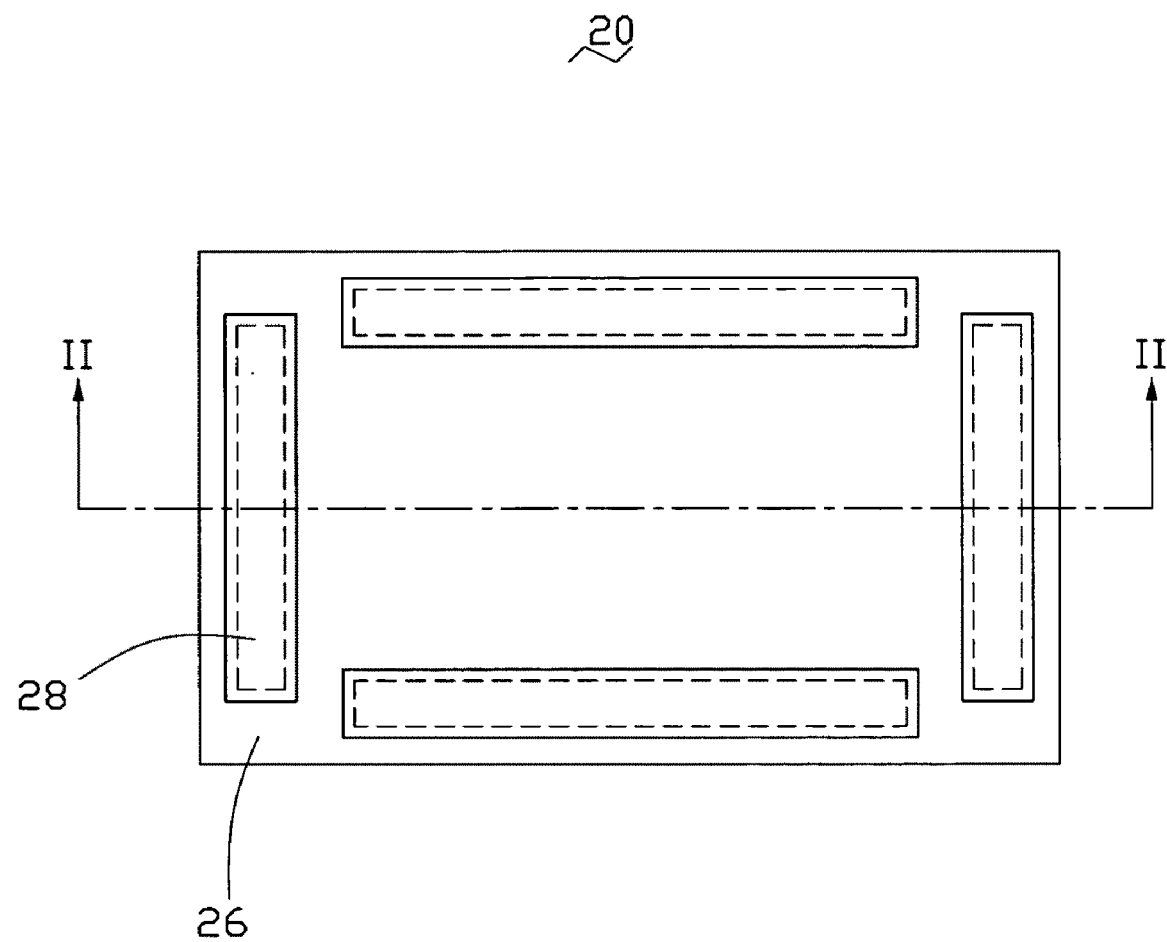
FIG. 1 is a top plan view of a touch panel in accordance with a present embodiment.

Corresponding reference characters indicate corresponding parts throughout the several views. The exemplifications set out herein illustrate at least one embodiment of the present touch panel and display device using the same, in at least one form, and such exemplifications are not to be construed as limiting the scope of the invention in any manner.

DETAILED DESCRIPTION OF EXEMPLARY EMBODIMENTS

Reference will now be made to the drawings to describe, in detail, embodiments of the present touch panel and display device using the same.

Figure 2:
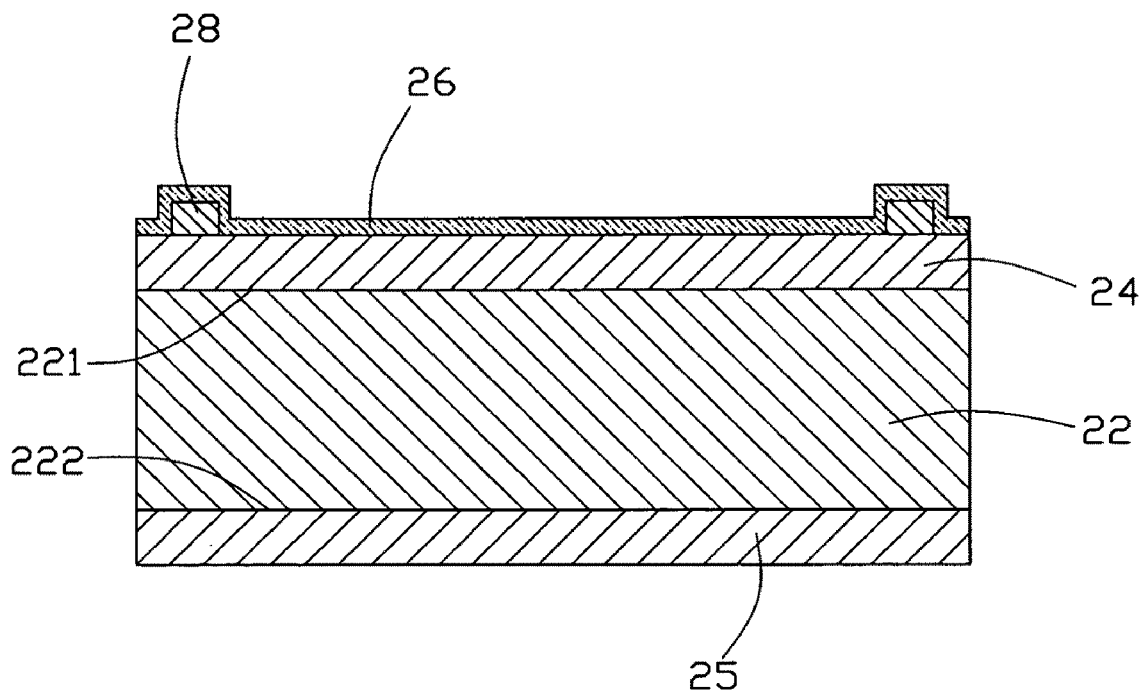
FIG. 2 is a side cross-sectional view of the touch panel of the present embodiment, taken along a line II-II of FIG. 1.

Referring to FIG. 1 and FIG. 2, a touch panel 20 includes a substrate 22, a transparent conductive layer 24, a transparent protective film 26, and at least two electrodes 28. The substrate 22 has a first surface 221 and a second surface 222 at opposite sides thereof respectively. The transparent conductive layer 24 is disposed on the first surface 221. The electrodes 28 are separately disposed towards the edges or corners of the transparent conductive layer 24 and are electrically connected therewith for forming an equipotential surface on the transparent conductive layer 24. The transparent protective film 26 covers the electrodes 28 and the surface of the transparent conductive layer 24 that faces away from the substrate 22.

It is to be noted that the shape of the substrate 22 and the transparent conductive layer 24 is chosen according to the requirements of the touch field (i.e., working area) of the touch panel 22. A shape of the working area of the touch panel 20 can be arbitrarily set. A shape of the electrodes 28 and the transparent conductive layer 24 depend on the shape of the working area (e.g. a rectangular area, or a triangular area) of the touch panel 20. Generally, the shape of the touch field may be triangular or rectangular.

In the present embodiment, the shapes of the touch field, the substrate, and the transparent conductive layer 24 are all rectangular. The four electrodes 28 are strip-shaped, and are separately disposed on the surface of the transparent conductive layer 24 that faces away from the substrate 22. It is to be understood that in alternative embodiments, the electrodes 28 can be separately disposed on different surfaces of the transparent conductive layer 24.

The electrodes 28 can be formed by metallic layers, conductive resin layers, carbon nanotube films or any other suitable materials. In the present embodiment, the material of the electrodes 28 is silver paste. It is noted that the electrodes 28 of the flexible touch panel 20 should be tough and flexible.

The substrate 22 is a transparent and flexible film or plate made of polymer, resin, or any other suitable flexible material. The material of the substrate 22 can be selected from a group consisting of polycarbonate (PC), polymethyl methacrylate (PMMA), polyethylene terephthalate (PET), polyether sulfones (PES), polyvinyl chloride (PVC), benzocyclobutenes (BCB), polyesters, acrylic resins or any other suitable material. A thickness of the substrate 22 can be in the approximate range from 1 millimeter to 1 centimeter. In the present embodiment, the substrate 22 is made of PET, and the thickness of the substrate 22 is about 2 millimeters. Understandably, the substrate 22 is used to support the transparent conductive layer 24. Thus the material of the substrate 22 should not be restricted to the above-mentioned materials, but can be any of various other suitable flexible and transparent materials.

The transparent conductive layer 24 includes a carbon nanotube layer. The carbon nanotube layer is formed by a plurality of carbon nanotubes, ordered or otherwise, and has substantially a uniform thickness. The carbon nanotube layer can include one or a plurality of transparent carbon nanotube films. It is to be understood that the size of the touch panel 20 is not confined by the size of the carbon nanotube films. When the size of the carbon nanotube films is smaller than the desired size of the touch panel 20, a plurality of carbon nanotube films can be disposed side by side and cover the entire surface of the substrate 22 to have multiple coplanar films. Thus, the size of the touch panel 20 can be arbitrarily set, as desired. It is to be understood that the plurality of carbon nanotube films can also be overlapped with each other to form the carbon nanotube layer. A thickness of the carbon nanotube layer is set as desired, as long as the carbon nanotube layer has an acceptable transparency. An alignment direction of carbon nanotubes in each carbon nanotube film is set as desired.

The carbon nanotube film can be an ordered film or a disordered film. In the ordered film, the carbon nanotubes are oriented along a same direction. In the disordered film, the carbon nanotubes are disordered or isotropic. The disordered carbon nanotubes are randomly entangled with each other.

The isotropic carbon nanotubes are substantially parallel to a surface of the carbon nanotube film.

A length and a width of the carbon nanotube film can be arbitrarily set as desired. A thickness of the carbon nanotube film is in an approximate range from 0.5 nanometers to 100 micrometers. The carbon nanotubes in the carbon nanotube film include single-walled carbon nanotubes, double-walled carbon nanotubes, or multi-walled carbon nanotubes. Diameters of the single-walled carbon nanotubes, the double-walled carbon nanotubes, and the multi-walled carbon nanotubes can, respectively, be in the approximate range from 0.5 to 50 nanometers, 1 to 50 nanometers, and 1.5 to 50 nanometers.

Figure 3:
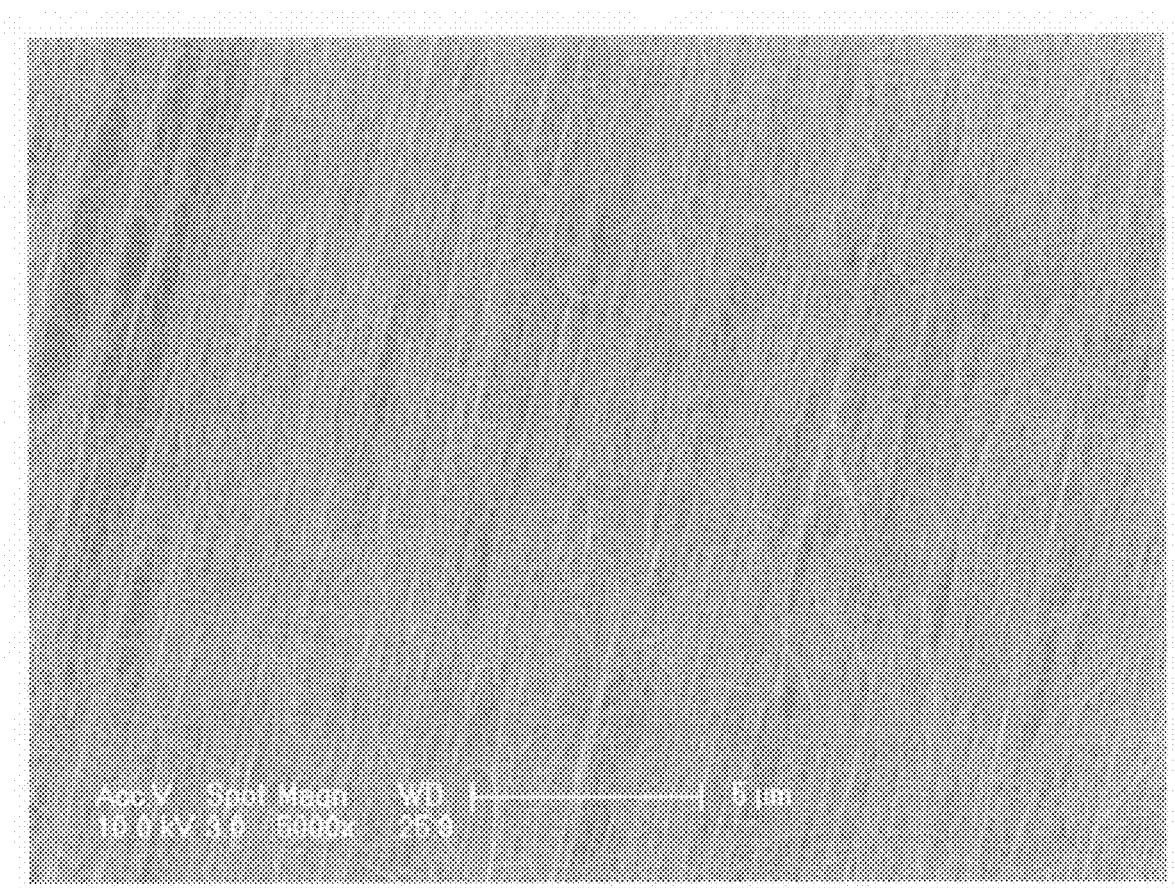
FIG. 3 shows a Scanning Electron Microscope (SEM) image of a carbon nanotube film used in the touch panel of FIG. 1.

In the present embodiment, the transparent conductive layer 24 is formed of a carbon nanotube layer, which includes a plurality of carbon nanotube films stacked one on the other. The alignment directions of the carbon nanotube films are set as desired. Typically, the carbon nanotubes in each carbon nanotube film are aligned substantially parallel to a same direction (i.e., the carbon nanotube film is an ordered film). As shown in FIG. 3, the majority of carbon nanotubes are arraigned along a primary direction; however, the orientation of some of the nanotubes may vary. More specifically, each carbon nanotube film includes a plurality of successive and oriented carbon nanotubes joined end to end by van der Waals attractive force.

Figure 4:
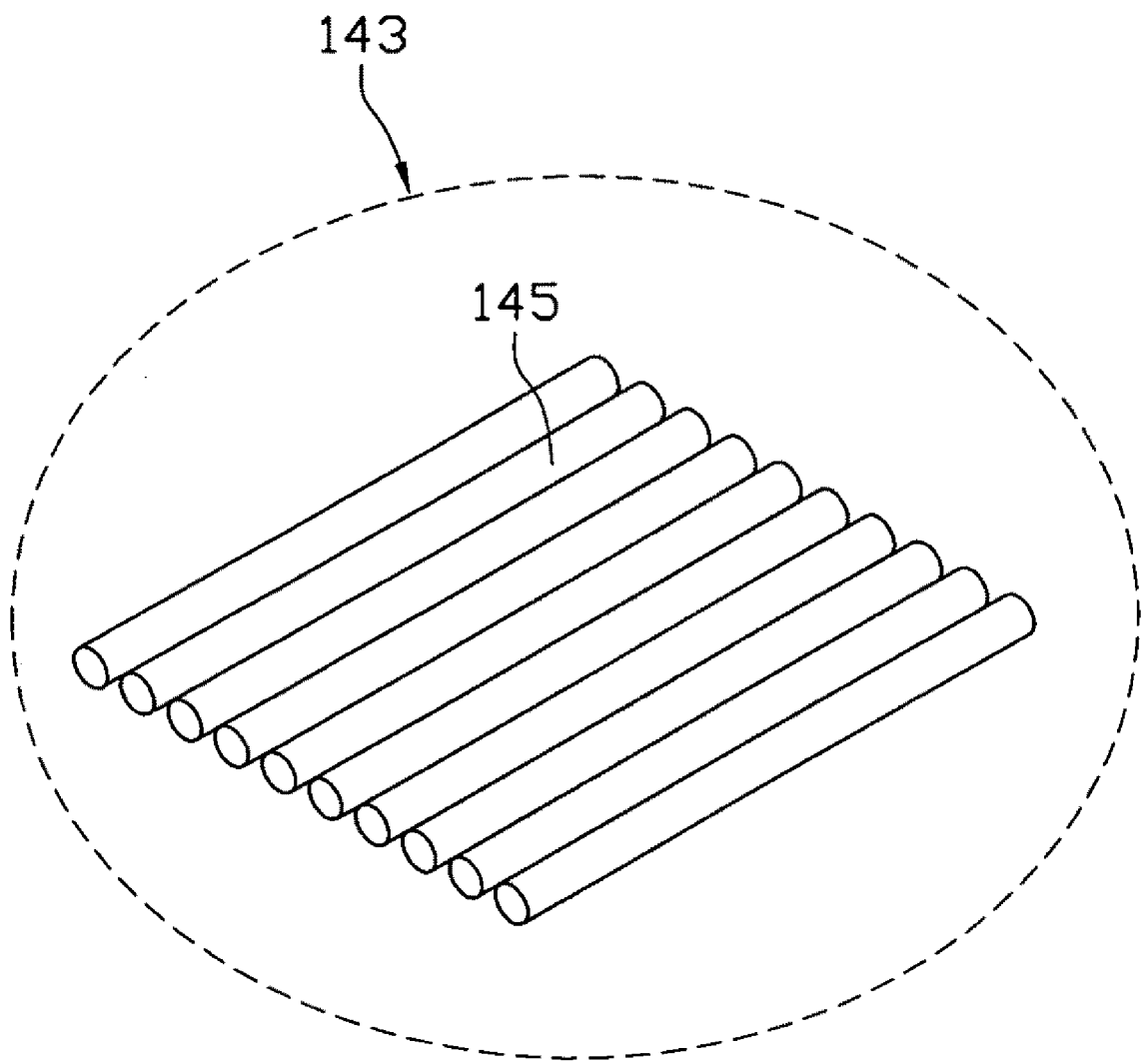
FIG. 4 is a structural schematic of a carbon nanotube segment.

Referring to FIGS. 3 and 4, each carbon nanotube film comprises a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. The carbon nanotube segments 143 can vary in width, thickness, uniformity and shape. The carbon nanotubes 145 in the carbon nanotube film 143 are also oriented along a preferred orientation.

A method for fabricating the above-described carbon nanotube film includes the steps of: (a) providing an array of carbon nanotubes, specifically, a super-aligned array of carbon nanotubes; and (b) pulling out a carbon nanotube film from the array of carbon nanotubes, by using a tool (e.g., adhesive tape, pliers, tweezers, or another tool allowing multiple carbon nanotubes to be gripped and pulled simultaneously).

In step (a), a given super-aligned array of carbon nanotubes can be formed by the substeps of: (a1) providing a substantially flat and smooth substrate; (a2) forming a catalyst layer on the substrate; (a3) annealing the substrate with the catalyst layer in air at a temperature in the approximate range from 700° C. to 900° C. for about 30 to 90 minutes; (a4) heating the substrate with the catalyst layer to a temperature in the approximate range from 500° C. to 740° C. in a furnace with a protective gas therein; and (a5) supplying a carbon source gas to the furnace for about 5 to 30 minutes and growing the super-aligned array of carbon nanotubes on the substrate.

In step (a1), the substrate can be a P-type silicon wafer, an N-type silicon wafer, or a silicon wafer with a film of silicon dioxide thereon. A 4-inch P-type silicon wafer is used as the substrate in the present embodiment.

In step (a2), the catalyst can be made of iron (Fe), cobalt (Co), nickel (Ni), or any alloy thereof.

In step (a4), the protective gas can be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can have a height of about 50 microns to 5 millimeters and include a plurality of carbon nanotubes parallel to each other and approximately perpendicular to the substrate. The carbon nanotubes in the array can be single-walled carbon nanotubes, double-walled carbon nanotubes, or multi-walled carbon nanotubes. Diameters of the single-walled carbon nanotubes are in the approximate range from 0.5 nanometers to 50 nanometers. Diameters of the double-walled carbon nanotubes are in the approximate range from 1 nanometer to 50 nanometers. Diameters of the multi-walled carbon nanotubes are in the approximate range from 1.5 nanometers to 50 nanometers.

The super-aligned array of carbon nanotubes formed under the above conditions is essentially free of impurities such as carbonaceous or residual catalyst particles. The carbon nanotubes in the super-aligned array are closely packed together by van der Waals attractive force.

In step (b), the carbon nanotube film, can be formed by the substeps of: (b1) selecting one or more carbon nanotubes having a predetermined width from the array of carbon nanotubes; and (b2) pulling the carbon nanotubes to form nanotube segments 143 at an even/uniform speed to achieve a uniform carbon nanotube film.

In step (b1), quite usefully, the carbon nanotube segment 143 includes a plurality of carbon nanotubes 145 parallel to each other. The carbon nanotube segments 143 can be selected by using an adhesive tape as the tool to contact the super-aligned array of carbon nanotubes. In step (b2), the pulling direction is substantially perpendicular to the growing direction of the super-aligned array of carbon nanotubes.

More specifically, during the pulling process, as the initial carbon nanotube segments are drawn out, other carbon nanotube segments are also drawn out end to end due to van der Waals attractive force between ends of adjacent segments. This process of drawing ensures a substantially continuous and uniform carbon nanotube film having a predetermined width can be formed. Referring to FIG. 3, the carbon nanotube film includes a plurality of carbon nanotubes joined ends to ends. The carbon nanotubes in the carbon nanotube film are all substantially parallel to the pulling/drawing direction of the carbon nanotube film, and the carbon nanotube film produced in such manner can be selectively formed to have a predetermined width. The carbon nanotube film formed by the pulling/drawing method has superior uniformity of thickness and conductivity over a typical disordered carbon nanotube film. Further, the pulling/drawing method is simple, fast, and suitable for industrial applications.

The width of the carbon nanotube film depends on a size of the carbon nanotube array. The length of the carbon nanotube film can be arbitrarily set, as desired. In one useful embodiment, when the substrate is a 4-inch P-type silicon wafer as in the present embodiment, the width of the carbon nanotube film is in an approximate range from 0.5 nanometers to 10 centimeters, and the thickness of the carbon nanotube film is in an approximate range from 0.5 nanometers to 100 microns. The carbon nanotubes in the carbon nanotube film include single-walled carbon nanotubes, double-walled carbon nanotubes, or multi-walled carbon nanotubes. Diameters of the single-walled carbon nanotubes, the double-walled carbon nanotubes, and the multi-walled carbon nanotubes can, respectively, be in an approximate range from 0.5 to 50 nanometers, 1 to 50 nanometers, and 1.5 to 50 nanometers.

It is noted that because the carbon nanotubes in the super-aligned carbon nanotube array have a high purity and a high specific surface area, the carbon nanotube film is adherent in nature. As such, the at least one carbon nanotube film can be directly adhered directly to the first surface 221 of the substrate 22 and/or another carbon nanotube film. In the alternative, other bonding means can be applied.

When the transparent conductive layer 24 includes a plurality of carbon nanotube films, the carbon nanotube films can be adhered to the first surface 221 of the substrate 22 along a same direction or different directions. When the carbon nanotube films are adhered along a same direction, the carbon nanotubes of the carbon nanotube layer are arranged along the same direction. When the carbon nanotube films are adhered along different directions, an angle α between the alignment directions of the carbon nanotubes in each two adjacent carbon nanotube films is in the range $0<\alpha\leq90°$. The placing the films at an angle helps increase the strength of the overall structure. Having the films aligned will increase the efficiently of the transmission.

Once the at least one carbon nanotube film is adhered to the first surface 221 of the substrate 22, the carbon nanotube film can be treated with an organic solvent. Specifically, the carbon nanotube film can be treated by applying organic solvent to the carbon nanotube film to soak the entire surface of the carbon nanotube film. The organic solvent is volatile and can be selected from the group consisting of ethanol, methanol, acetone, dichloroethane, chloroform, any appropriate mixture thereof. In the present embodiment, the organic solvent is ethanol. After being soaked by the organic solvent, microscopically, carbon nanotube strings will be formed by adjacent carbon nanotubes in the carbon nanotube film, that are able to do so, bundling together, due to the surface tension of the organic solvent. In one aspect, part of the carbon nanotubes in the untreated carbon nanotube film that are not adhered on the substrate will come into contact with the first surface 221 of the substrate 22 after the organic solvent treatment due to the surface tension of the organic solvent. Then the contacting area of the carbon nanotube film with the substrate will increase, and thus, the carbon nanotube film can more firmly adhere to the first surface 221 of the substrate 22. In another aspect, due to the decrease of the specific surface area via bundling, the mechanical strength and toughness of the carbon nanotube film are increased and the coefficient of friction of the carbon nanotube films is reduced. Macroscopically, the film will be an approximately uniform carbon nanotube film.

Unlike previous methods for making an ITO film, the present method does not require a vacuum environment and heat processing, due to the carbon nanotube film being obtained by being pulled out from an array of carbon nanotubes. Thus, the carbon nanotube layer formed of the at least one carbon nanotube film and used in the transparent conductive layer 24 has the advantage of being low cost, environmentally safe, and energy efficient.

Further, in order to prolong operational life span and restrict coupling capacitance of the touch panel 20, the transparent protective film 26 is disposed on the electrodes 28 and the transparent conductive layer 24. The transparent protective film 26 can be a plastic film and receives a surface hardening treatment to protect the electrodes 28 and the transparent conductive layer 24 from being scratched when in use. The transparent protective film 26 can be adhered to the transparent conductive layer 24 or combined with the transparent conductive layer 24 by a hot-pressing method. The transparent protective film 26 can be a plastic film or a resin film. The material of the resin film can be selected from a group consisting of benzocyclobutenes (BCB), polyesters, acrylic resins, polyethylene terephthalate (PET), and any combination thereof.

In the present embodiment, the material of the transparent protective film 26 is PET. The hardness and thickness of the transparent protective film 26 are selected according to practical needs. The transparent protective film 26 is adhered to the transparent conductive layer 24.

The touch panel 20 can further include a shielding layer 25 disposed on the second surface 222 of the substrate 22. The material of the shielding layer 25 can be conductive resin film, carbon nanotube film, or another kind of flexible and conductive film. In the present embodiment, the shielding layer 25 is a carbon nanotube film. The carbon nanotube film includes a plurality of carbon nanotubes, and the orientation of the carbon nanotubes therein can be arbitrarily determined. The carbon nanotubes in the carbon nanotube film of the shielding layer can be arranged along a same direction. The carbon nanotube film is connected to ground and acts as shielding, thus enabling the touch panel 20 to operate without interference (e.g., electromagnetic interference).

Figure 5:
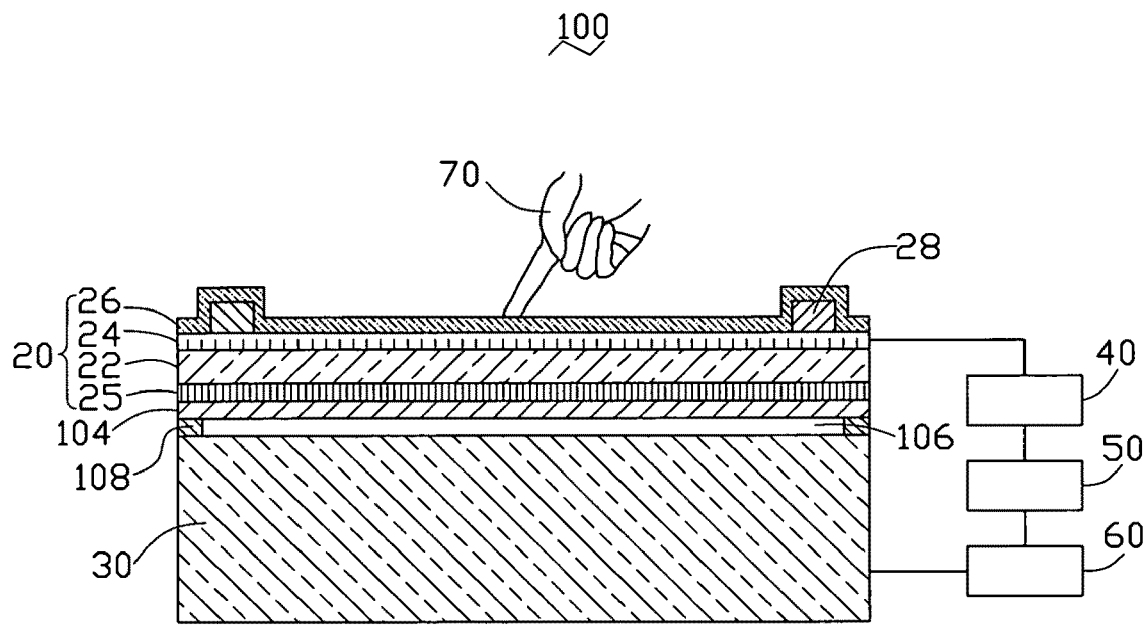
FIG. 5 is a side cross-sectional view of the touch panel of FIG. 2 used with a display element of a display device.

Referring to FIG. 5, a display device 100 includes the touch panel 20, a display element 30, a touch panel controller 40, a central processing unit (CPU) 50, and a display element controller 60. The touch panel 20 is opposite and adjacent to the display element 30. The touch panel 20 can be spaced from the display element 30 a distance or can be installed directly on the display element 30. The touch panel 20 is connected to the touch panel controller 40 by an external circuit. The touch panel controller 40, the CPU 50 and the display element controller 60 are electrically connected. The CPU 50 is connected to the display element controller 60 to control the display element 30.

The display element 30 can be, e.g., an e-paper (i.e., a microencapsulated electrophoretic display), a flexible liquid crystal display, a flexible organic light emitting display (OLED), or any other flexible display. Further, the display element 30 can be a conventional display such as a liquid crystal display, field emission display, plasma display, electroluminescent display, vacuum fluorescent display, cathode ray tube, or another kind of display device.

When the shielding layer 25 is disposed on the second surface 222 of the substrate 22, a passivation layer 104 is disposed on a surface of the shielding layer 25 that faces away from the substrate 22. The material of the passivation layer 104 can be selected from a group consisting of benzocyclobutenes (BCB), polyesters, acrylic resins, polyethylene terephthalate (PET), and any combination thereof. The passivation layer 104 can be spaced at a distance from the display element 30 or can be directly installed on the display element 30. When the passivation layer 104 is spaced at a distance from the display element 30, understandably, two or more spacers 108 can be used. Thereby, a gap 106 is provided between the passivation layer 104 and the display element 30. The passivation layer 104 protect the shielding layer 25 from chemical damage (e.g., humidity of the surrounding) or mechanical damage (e.g., scratching during fabrication of the touch panel).

In operation, a voltage is applied to the electrodes 28 respectively. A user operates the display device 100 by pressing or touching the transparent protective film 26 of the touch panel 20 with a touch tool 70, such as a finger, or an electrical pen/stylus, while visually observing the display element 30 through the touch panel 20. In the illustration, the touch tool 70 is the user's finger. Due to an electrical field of the user, a coupling capacitance forms between the user and the transparent conductive layer 24. For high frequency electrical current, the coupling capacitance is a conductor, and thus the touch tool 70 takes away a little current from the touch point. Currents flowing through the four electrodes 28 cooperatively replace the current lost at the touch point. The quantity of current supplied by each electrode 28 is directly proportional to the distance from the touch point to the electrode 28. The touch panel controller 40 is used to calculate the proportion of the four supplied currents, thereby detecting coordinates of the touch point on the touch panel 20. Then the touch panel controller 40 sends the coordinates of the touch point to the CPU 50. The CPU 50 receives the coordinates, and processes the coordinates into a command. Finally, the CPU 50 sends out the command to the display element controller 60. The display element controller 60 controls the display of the display element 30 accordingly.

The carbon nanotube layer provided in the present embodiments has superior properties, such as excellent toughness, high mechanical strength, and uniform conductivity. Thus, the touch panel 20 and the display device 100 using the same are durable and highly conductive. Each carbon nanotube film includes a plurality of successively oriented carbon nanotubes joined end to end by the van der Waals attractive force therebetween. As such, the carbon nanotube layer is flexible, and suitable for using as the conductive layer in a flexible touch panel. Further, the pulling method for fabricating each carbon nanotube film is simple, and the adhesive carbon nanotube films can be disposed on the substrate 22 and/or on each other directly without the use of an adhesive. As such, the method for fabricating each carbon nanotube film is suitable for the mass production of touch panels and display devices using the same, and reduces the costs thereof. Furthermore, the carbon nanotube film stack has high transparency, thereby promoting improved brightness of the touch panel 20 and the display device 100 using the same. Additionally, since the carbon nanotubes have excellent electrical conductivity properties, the carbon nanotube layer formed by one or more of the carbon films has a uniform resistance distribution. Thus the touch panel 20 and the display device 100 adopting the carbon nanotube layer have improved sensitivity and accuracy.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A capacitance-type touch panel comprising:
   a flexible substrate comprising a surface;
   a transparent conductive layer disposed on the surface of the substrate, the transparent conductive layer comprising a carbon nanotube layer; and
   at least two electrodes electrically connected with the transparent conductive layer,
   wherein the carbon nanotube layer comprises a plurality of carbon nanotube films directly stacked on each other, each of the plurality of carbon nanotube films comprises a plurality of carbon nanotubes oriented along a same direction, an angle between the plurality of carbon nanotubes in two adjacent carbon nanotube films is greater than 0° and less than or equal to 90°, the plurality of carbon nanotubes are non-functionalized carbon nanotubes.

2. The capacitance-type touch panel as claimed in claim 1, wherein the plurality of carbon nanotube films is coplanar.

3. The capacitance-type touch panel as claimed in claim 1, wherein the plurality of carbon nanotubes are parallel to a surface of the plurality of carbon nanotube films.

4. The capacitance-type touch panel as claimed in claim 1, wherein the plurality of carbon nanotubes in each of the plurality of carbon nanotube films are successive and joined end to end by van der Waals attractive force therebetween.

5. The capacitance-type touch panel as claimed in claim 1, wherein the plurality of carbon nanotubes is selected from the group consisting of single-walled carbon nanotubes, double-walled carbon nanotubes, and multi-walled carbon nanotubes, diameters of the single-walled carbon nanotubes, the double-walled carbon nanotubes, and the multi-walled carbon nanotubes are respectively in the approximate range from 0.5 to 50 nanometers, 1 to 50 nanometers, and 1.5 to 50 nanometers.

6. The capacitance-type touch panel as claimed in claim 1, wherein the material of the flexible substrate is selected from the group consisting of polycarbonate, polymethyl methacrylate, polyethylene terephthalate, polyether sulfones, polyvinyl chloride, benzocyclobutenes, polyesters, and acrylic resins.

7. The capacitance-type touch panel as claimed in claim 1, wherein the at least two electrodes are separately disposed on the transparent conductive layer, and the material of the electrodes is selected from the group consisting of metal, conductive resins, and silver pastes.

8. The capacitance-type touch panel as claimed in claim 1, further comprising a transparent protective film disposed on a surface of the transparent conductive layer, wherein the material of the transparent protective film is selected from the group consisting of benzocyclobutenes, polyesters, acrylic resins, polyethylene terephthalate, and any combination thereof.

9. The capacitance-type touch panel as claimed in claim 1, further comprising a shielding layer disposed on the substrate, wherein the material of the shielding layer is selected from the group consisting of conductive resin films, carbon nanotube films, and any combination thereof.

10. The capacitance-type touch panel as claimed in claim 9, wherein the shielding layer comprises a plurality of carbon nanotubes aligned parallel to a same direction.

11. A display device comprising:
    a capacitance-type touch panel comprising:
    a flexible substrate,
    a transparent conductive layer disposed on a surface of the substrate, and
    at least two electrodes electrically connected with the transparent conductive layer; and
    a display element adjacent to the touch panel,
    wherein the transparent conductive layer consists of a carbon nanotube layer, and the carbon nanotube layer consists of a plurality of carbon nanotubes, the plurality of carbon nanotubes are non-functionalized carbon nanotubes.

12. The display device as claimed in claim 11, further comprising a first controller configured for controlling the capacitance-type touch panel, a central processing unit, and a second controller configured for controlling the display element, the first controller, the central processing unit and the second controller being electrically connected with each other, the display element being connected to the second controller, and the capacitance-type touch panel being connected to the first controller.

13. The display device as claimed in claim 11, wherein the display element is selected from the group consisting of e-papers, flexible liquid crystal displays, and flexible organic light emitting displays.

14. The display device as claimed in claim 11, further comprising a passivation layer disposed between the capacitance-type touch panel and the display element, wherein the material of the passivation layer is selected from the group consisting of benzocyclobutenes, polyesters, acrylic resins, polyethylene terephthalate, and any combination thereof.

15. The display device as claimed in claim 11, wherein the carbon nanotube layer consists of a plurality of carbon nanotube films directly stacked on each other, the plurality of carbon nanotubes in each of the plurality of carbon nanotube films are oriented along a same direction, and an angle between the plurality of carbon nanotubes in two adjacent carbon nanotube films is greater than 0° and less than or equal to 90°.

16. The display device as claimed in claim 15, wherein the plurality of carbon nanotubes in each of the plurality of carbon nanotube films are successive and joined end to end by van der Waals attractive force therebetween.

17. A capacitance-type touch panel comprising:
a flexible substrate comprising a surface;
a transparent conductive layer disposed on the surface of the substrate, the transparent conductive layer comprising a carbon nanotube layer; and
at least two electrodes electrically connected with the transparent conductive layer,
wherein the carbon nanotube layer comprises at least one carbon nanotube film, and the at least one carbon nanotube film comprises a plurality of carbon nanotubes oriented along a same direction, the plurality of carbon nanotubes are non-functionalized carbon nanotubes.

18. The capacitance-type touch panel as claimed in claim 17, wherein the plurality of carbon nanotubes are successive and joined end to end by van der Waals attractive force therebetween.

19. The capacitance-type touch panel as claimed in claim 18, wherein the transparent conductive layer consists of the carbon nanotube layer, and the carbon nanotube layer consists of the plurality of carbon nanotubes.

* * * * *